(12) United States Patent
Matsuoka et al.

(10) Patent No.: US 11,108,926 B2
(45) Date of Patent: Aug. 31, 2021

(54) SHEET PROCESSING APPARATUS, SHEET PROCESSING SYSTEM, SHEET PROCESSING METHOD, AND SHEET PROCESSING PROGRAM

(71) Applicant: GLORY LTD., Hyogo (JP)

(72) Inventors: Yoshinobu Matsuoka, Hyogo (JP); Osamu Ito, Hyogo (JP)

(73) Assignee: GLORY LTD., Hyogo (JP)

( * ) Notice: Subject to any disclaimer, the term of this patent is extended or adjusted under 35 U.S.C. 154(b) by 0 days.

(21) Appl. No.: 16/633,662

(22) PCT Filed: Jul. 13, 2018

(86) PCT No.: PCT/JP2018/026589
§ 371 (c)(1),
(2) Date: Jan. 24, 2020

(87) PCT Pub. No.: WO2019/021872
PCT Pub. Date: Jan. 31, 2019

(65) Prior Publication Data
US 2020/0213461 A1    Jul. 2, 2020

(30) Foreign Application Priority Data
Jul. 28, 2017  (JP) .............................. JP2017-146768

(51) Int. Cl.
*H04N 1/00* (2006.01)
(52) U.S. Cl.
CPC ....... *H04N 1/00631* (2013.01); *H04N 1/0032* (2013.01); *H04N 1/00326* (2013.01)
(58) Field of Classification Search
None
See application file for complete search history.

(56) References Cited

U.S. PATENT DOCUMENTS

| | | | |
|---|---|---|---|
| 2012/0243056 A1* | 9/2012 | Yamaguchi | G06K 9/03 358/462 |
| 2014/0280772 A1* | 9/2014 | Miyata | H04N 1/00244 709/219 |
| 2016/0203363 A1* | 7/2016 | Kashima | G06K 9/00442 382/218 |

FOREIGN PATENT DOCUMENTS

| JP | 2002-334362 | 11/2002 |
|---|---|---|
| JP | 2007-11949 | 1/2007 |

(Continued)

OTHER PUBLICATIONS

International Search Report issued in International Patent Application No. PCT/JP2018/026589, dated Sep. 4, 2018.

(Continued)

*Primary Examiner* — Frantz Bataille
(74) *Attorney, Agent, or Firm* — Greenblum & Bernstein, P.L.C.

(57) ABSTRACT

Provided is a sheet processing apparatus which enables processing of a sheet without a decrease in processing efficiency even when the phenomenon that the information cannot be read from the header card arises. The sheet processing apparatus is a sheet processing apparatus that successively processes a plurality of processing-target sheets forming a sheet group, the sheet group including at least one sheet set, the at least one sheet set including a first sheet that is given first recognition information and a second sheet, the sheet processing apparatus includes a recognition unit that reads the first recognition information from one of the plurality of processing-target sheets and a controller that generates second recognition information associated with the one of the plurality of processing-target sheets when the recognition unit fails to read the first recognition information from the one of the plurality of processing-target sheets and a predetermined condition is satisfied.

10 Claims, 3 Drawing Sheets

(56) References Cited

FOREIGN PATENT DOCUMENTS

JP     2008-165396     7/2008
WO    2010/038265    4/2010

OTHER PUBLICATIONS

Extended European search report dated Mar. 24, 2021 issued in European patent application No. 18838379.8.

* cited by examiner

SHEET PROCESSING APPARATUS, SHEET PROCESSING SYSTEM, SHEET PROCESSING METHOD, AND SHEET PROCESSING PROGRAM

TECHNICAL FIELD

The present invention relates to a sheet processing apparatus, a sheet processing system, a sheet processing method, and a sheet processing program for processing a sheet.

BACKGROUND ART

Conventionally, there have been proposed sheet processing systems that sort and process a plurality of banknote bundles using header cards (hereinafter, referred to as "HCs" when necessary) each of which is given information in the form of a bar code or the like.

Patent Literature (hereinafter, referred to as "PTL") 1 discloses one example of such sheet processing systems. In the sheet processing system disclosed in PTL 1, when information could not be read from a HC provided with a bar code, the HC and banknotes associated with the HC are once transported inside a sheet processing apparatus and are then gathered in a reject stacking unit. Then, the banknotes gathered in the reject stacking unit are again supplied together with a new HC to the sheet processing apparatus, and are processed.

CITATION LIST

Patent Literature

PTL 1
Japanese Patent Application Laid-Open No. 2007-011949

SUMMARY OF INVENTION

Technical Problem

In the sheet processing system disclosed in PTL 1, the banknotes associated with the HC are thus transported twice inside the sheet processing apparatus when the information could not be read from the HC.

Accordingly, when a phenomenon that the information cannot be read from the HC arises in a case where the sheet processing system disclosed in PTL 1 is used, processing efficiency decreases seriously.

The present invention aims to provide a sheet processing apparatus, a sheet processing system, a sheet processing method, and a sheet processing program which make it possible to process a sheet without a decrease in processing efficiency even when the phenomenon that the information cannot be read from the header card arises.

Solution to Problem

A sheet processing apparatus according to the present invention is a sheet processing apparatus that successively processes a plurality of processing-target sheets forming a sheet group, the sheet group including at least one sheet set, the at least one sheet set including a first sheet that is given first recognition information and a second sheet, the sheet processing apparatus comprising: a recognition unit that reads the first recognition information from one of the plurality of processing-target sheets; and a controller that generates second recognition information associated with the one of the plurality of processing-target sheets when the recognition unit fails to read the first recognition information from the one of the plurality of processing-target sheets and a predetermined condition is satisfied.

A sheet processing system according to the present invention comprises: a sheet processing apparatus that successively processes a plurality of processing-target sheets forming a sheet group, the sheet group including at least one sheet set, the at least one sheet set including a first sheet that is given first recognition information and a second sheet, the sheet processing apparatus comprising: a recognition unit that reads the first recognition information from one of the plurality of processing-target sheets; and a controller that generates second recognition information associated with the one of the plurality of processing-target sheets when the recognition unit fails to read the first recognition information from the one of the plurality of processing-target sheets and a predetermined condition is satisfied; and a terminal that is communicably connected to the sheet processing apparatus, and obtains the second recognition information.

A sheet processing method according to the present invention is a sheet processing method for successively processing a plurality of processing-target sheets forming a sheet group, the sheet group including at least one sheet set, the at least one sheet set including a first sheet that is given first recognition information and a second sheet, the sheet processing method comprising: obtaining the first recognition information from one of the plurality of processing-target sheets; and generating second recognition information associated with the one of the plurality of processing-target sheets when the first recognition information is not obtained successfully from the one of the plurality of processing-target sheets and a predetermined condition is satisfied.

A sheet processing program according to the present invention is a sheet processing program for successively processing a plurality of processing-target sheets forming a sheet group, the sheet group including at least one sheet set, the at least one sheet set including a first sheet that is given first recognition information and a second sheet, the sheet processing program causing a computer to execute processes of: obtaining the first recognition information from one of the plurality of processing-target sheets; and generating second recognition information associated with the one of the plurality of processing-target sheets when the first recognition information is not obtained successfully from the one of the plurality of processing-target sheets and a predetermined condition is satisfied.

Advantageous Effects of Invention

According to the present invention, it is possible to process a sheet without a decrease in processing efficiency even when the phenomenon that the information cannot be read from the header card arises.

DESCRIPTION OF EMBODIMENTS

The present invention will be described in detail below with reference to the accompanying drawings. In the following, a description will be given of a case where a banknote is used as a sheet.

Note that, a "rejected banknote" as used in this specification refers to a banknote which cannot be a processing target for predetermined processing. Examples of the rejected banknote include: a counterfeit note; and a banknote which is passed through a below-mentioned recognition unit obliquely or overlappingly and therefore cannot be correctly recognized by the recognition unit. A "fit note" refers to a banknote which is comparatively less stained, torn, and the like, and an "unfit note" refers to a banknote which is comparatively more stained, torn, and the like.

Figure 1:
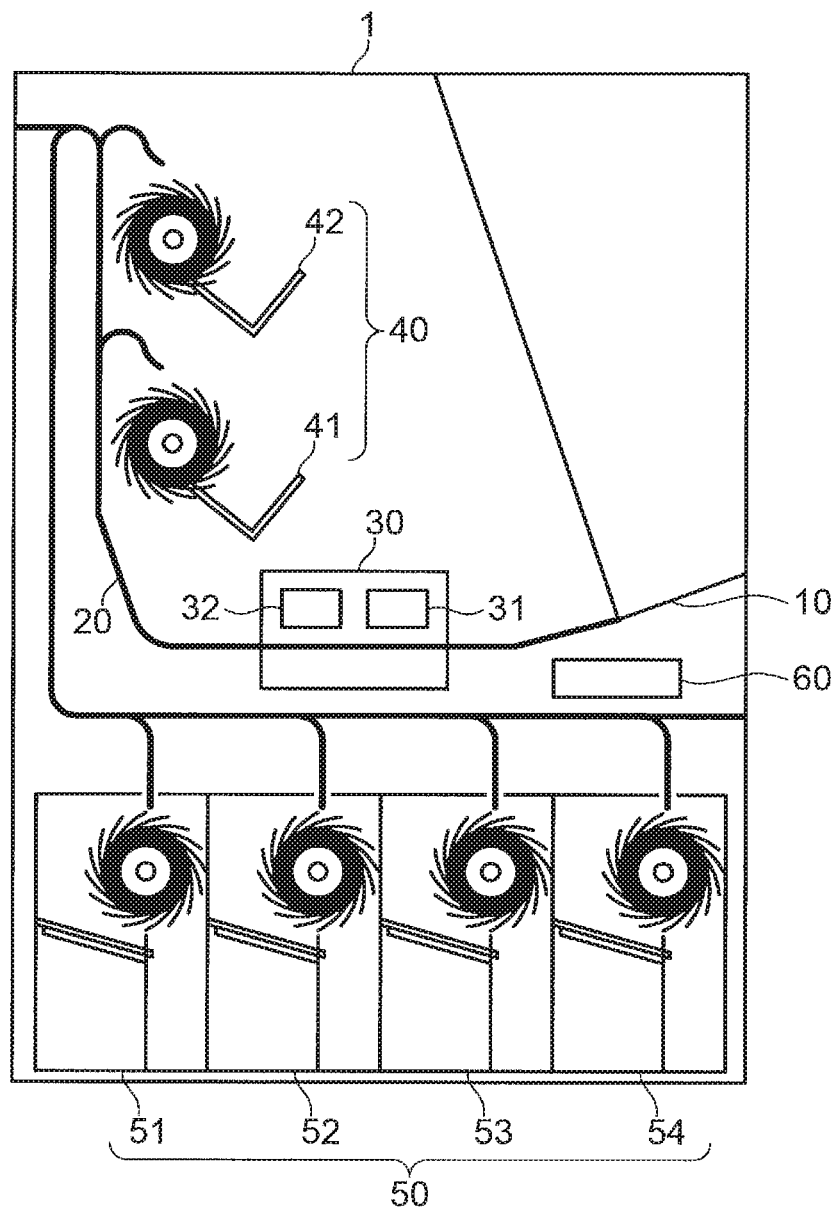
FIG. 1 is a schematic sectional view of a banknote processing apparatus.

FIG. 1 is a schematic sectional view of a banknote processing apparatus 1 of one embodiment of the present invention. The banknote processing apparatus 1 is installed in a bank, a cash center, and the like, and sorts banknotes according to the authenticity, fitness, denomination, and the like. Note that, the cash center is a base at which banknotes collected from cash processing apparatuses installed in a bank, a retail store, and the like are counted and sorted.

The banknote processing apparatus 1 comprises a banknote inlet unit 10 having a hopper for placing therein a HC and banknotes stacked on one another. The banknote inlet unit 10 has a feeding mechanism (not illustrated) comprised of a feeding roller and the like. The feeding mechanism feeds the HC and banknotes stacked in the upper and lower direction into the banknote processing apparatus 1 one by one sequentially from the bottom. Note that, the HC is formed of a sheetlike member of paper, resin, or the like.

The banknote processing apparatus 1 comprises a transport unit 20 that transports the banknotes. The transport unit 20 is comprised, for example, of a plurality of transport rollers (not illustrated) and a transport belt (not illustrated) wound around the transport rollers under tension. The transport unit 20 transports the HC and the banknotes one by one which have been fed from the banknote inlet unit 10.

A recognition unit 30 is disposed on or above the transport unit 20. The recognition unit 30 comprises a first recognition unit 31 and a second recognition unit 32. Each of the first recognition unit 31 and the second recognition unit 32 includes various sensors such as a magnetic sensor, an optical sensor, and the like.

The first recognition unit 31 obtains, from a sheet transported by the transport unit 20, characteristics such as optical characteristics, magnetic characteristics, shape, size, and the like which are necessary for recognizing at least whether or not the sheet is the HC.

The second recognition unit 32 obtains, from the HC, at least first recognition information given in the form of a bar code or the like to the HC. Note that, the first recognition information is information indicating the attributes of the banknotes (banknote bundle) associated with the HC.

In addition, at least one of the first recognition unit 31 and the second recognition unit 32 obtains, from each of the banknotes, information necessary for recognizing the denomination, authenticity, fitness, and the like. Note that, any one of the first recognition unit 31 and the second recognition unit 32 may be disposed upstream on or above the transport unit 20. Note also that, in addition to the first recognition unit 31 and the second recognition unit 32, the recognition unit 30 may comprise a third recognition unit that obtains, from each of the banknotes, information necessary for recognizing the denomination, authenticity, fitness, and the like.

The banknote processing apparatus 1 comprises, at its upper part, a reject unit 40. The reject unit 40 is comprised of a first reject unit 41 and a second reject unit 42. Each of the first reject unit 41 and the second reject unit 42 is connected to the transport unit 20. Those banknotes which are recognized as rejected banknotes by the recognition unit 30 and those banknotes which could not be recognized by the recognition unit 30 are transported to and stacked up in the first reject unit 41 or the second reject unit 42. Sheets other than the banknotes, including the HC, are also transported to and stacked up in the first reject unit 41 or the second reject unit 42. The sheets stacked up in the first reject unit 41 or the second reject unit 42 can be taken outside the banknote processing apparatus 1. Note that, the reject unit 40 may also be comprised only of the first reject unit 41.

The banknote processing apparatus 1 also comprises, at its lower part, a stacking unit 50. The stacking unit 50 is comprised of a first stacker 51, a second stacker 52, a third stacker 53, and a fourth stacker 54. Each of the first stacker 51 to the fourth stacker 54 is connected to the transport unit 20. Those banknotes which are recognized as normal banknotes by the recognition unit 30 are sorted by denomination or the like, transported, and stacked up in the first stacker 51 to the fourth stacker 54. It is possible to take the stacked banknotes outside the banknote processing apparatus 1. Note that, it is natural that the number of stackers constituting the stacking unit 50 is not limited to four.

The banknote processing apparatus 1 also comprises a controller 60 that controls the components of the banknote processing apparatus 1. The controller 60 is comprised of a CPU, a memory, an interface, and the like. Various operations and controls of the banknote processing apparatus 1 described below are realized by the CPU executing a predetermined program stored in the memory.

Figure 2:
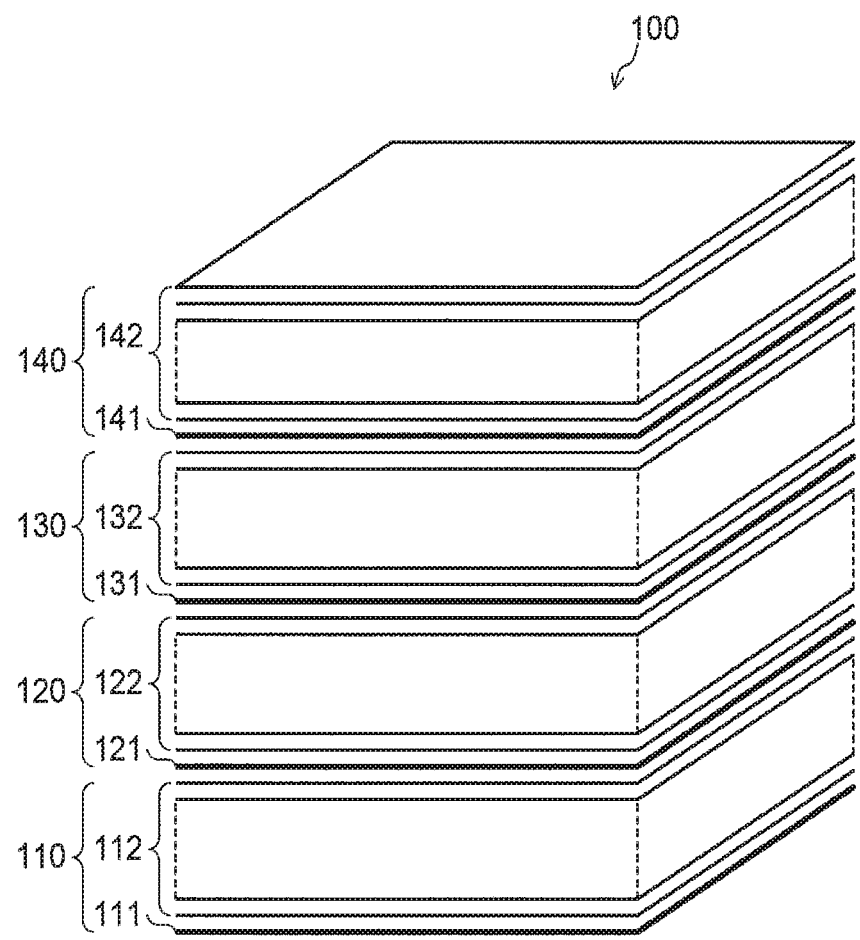
FIG. 2 schematically illustrates a sheet group to be processed.

FIG. 2 schematically illustrates the HCs and banknotes stacked on one another which are to be placed in the banknote inlet unit. The HCs and banknotes as the processing-target sheets are stacked on one another, and constitute a sheet group 100. The sheet group includes a first sheet set 110, a second sheet set 120, a third sheet set 130, and a fourth sheet set 140 sequentially from the bottom.

Each of the sheet sets includes a HC and a banknote bundle. That is, the first sheet set 110 includes a first HC 111 and a first banknote bundle 112. In addition, the second sheet set 120 includes a second HC 121 and a second banknote bundle 122. In addition, the third sheet set 130 includes a third HC 131 and a third banknote bundle 132. In addition, the fourth sheet set 140 includes a fourth HC 141 and a fourth banknote bundle 142. These HCs and the banknotes included in these banknote bundles are the processing-target sheets to be processed by the banknote processing apparatus 1. That is, the processing-target sheets are sheets constituting the sheet group including at least one or more sheet sets each including the HC and the banknotes.

The HC is disposed at the bottom in each of the sheet sets. That is, the HC is a sheet to be processed first in each of the sheet sets by the banknote processing apparatus 1. Note that, the HC may also be disposed on the top in each of the sheet sets. Note also that, each of the sheet sets may include a pair of HCs and this pair of HCs may be disposed to sandwich the banknote bundle.

Each of the first HC 111 to the fourth HC 141 is given information, for example, in the form of a bar code, for identifying what kind of banknote bundle each of the first banknote bundle 112 to the fourth banknote bundle 142 is. In other words, the first HC 111 is given first recognition information associated with corresponding the first banknote bundle 112, the second HC 121 is given first recognition information associated with corresponding the second banknote bundle 122, the third HC 131 is given first recognition information associated with corresponding the third banknote bundle 132, and the fourth HC 141 is given first recognition information associated with corresponding the fourth banknote bundle 142. The first HC 111 is, for example, given any one or more of information identifying of which store and at what date the first banknote bundle 112 is proceeds from sales, and, information indicating the total money amount of the banknotes that are or should be included in the first banknote bundle 112.

The banknote processing apparatus 1 according to the present embodiment operates as follows.

The banknote inlet unit 10 feeds the HCs and banknotes, that is, the processing-target sheets, constituting the sheet group 100 placed in the banknote inlet unit 10 into the banknote processing apparatus 1 one by one sequentially from the bottom in the sheet group 100.

Accordingly, the first sheet set 110 located at the bottom in the sheet group 100 is processed first among the sheet sets constituting the sheet group 100, and the first HC 111 located at the bottom in the first sheet set 110 is processed first.

The first HC 111 fed by the banknote inlet unit 10 is transported by the transport unit 20, and is recognized to be the HC by the first recognition unit 31 in the middle of transportation. Then, the second recognition unit 32 obtains the first recognition information given to the HC 111. For example, the information that "the first sheet set 110 is the proceeds from sales of a store A" is obtained from the HC 111 by the second recognition unit 32.

The first HC 111 is then transported to the first reject unit 41.

Subsequent to the first HC 111, the banknotes constituting the first banknote bundle 112 are fed by the banknote inlet unit 10 successively into the banknote processing apparatus 1.

After fed by the banknote inlet unit 10, the banknotes constituting the first banknote bundle 112 are transported by the transport unit 20, and are recognized by the recognition unit 30, that is, the first recognition unit 31 or the second recognition unit 32 in the middle of transportation.

The banknotes recognized by the recognition unit 30 are sorted by denomination according to a recognition result, transported by the transport unit 20 to any of the first stacker 51 to the fourth stacker 54, and stacked in the stacker.

Through these processes, the controller 60 obtains the first recognition information (e.g., the information that "the first sheet set 110 is the proceeds from sales of the store A") obtained from the first HC 111. In addition, the controller 60 counts the number of the banknotes for each denomination included in the first banknote bundle 112. It is thus possible for the controller 60 to obtain the information on how much the proceeds from sales of the store A are and how many the banknotes for each denomination are included in the proceeds from sales.

In addition, those banknotes which are recognized to be the rejected banknotes by the recognition unit 30 are transported to the first reject unit 41 and stacked on top of the first HC 111. It is probable that the rejected banknotes include a banknote which was not correctly recognized because of at least one of its wrong attitude and its wrong position during transportation and thus recognized to be the rejected banknote. It is necessary in that case to appropriately process such the rejected banknote to include it in the proceeds from sales of the store A.

For this reason, the banknotes recognized to be the rejected banknotes and stacked on top of the first HC 111 are, while they are stacked on top of the first HC 111, again placed together with the first HC 111 in the banknote inlet unit 10 and processed successively by the banknote processing apparatus 1.

Accordingly, the banknotes included in the first banknote bundle 112 and recognized to be the rejected banknotes are recognized again by the recognition unit 30. It is thus possible to recognize such banknotes correctly and to include them in the proceeds from sales of the store A.

Note that, the banknotes stacked on top of the first HC 111 may be placed in the banknote inlet unit 10 after the banknote inlet unit 10 becomes empty, that is, after all of the banknotes included in the fourth sheet set 140 are fed into the banknote processing apparatus 1. Alternatively, the banknotes stacked on top of the first HC 111 may also be placed in the banknote inlet unit 10 on top of the sheet group 100 remaining in the banknote inlet unit 10.

The processing of the first sheet set 110 is completed by the above processing.

Once all the banknotes of the first banknote bundle 112 are fed, processing of the second sheet set 120 is started subsequently. The second sheet set 120 is processed like the first sheet set 110.

Once all the banknotes of the second banknote bundle 122 are fed, processing of the third sheet set 130 is started subsequently. The third sheet set 130 is processed like the first sheet set 110.

Once all the banknotes of the third banknote bundle 132 are fed, processing of the fourth sheet set 140 is started subsequently. The fourth sheet set 140 is processed like the first sheet set 110.

However, it is preferable that a HC and rejected banknotes be transported to a transport destination different from a transport destination to which another HC included in the sheet set processed immediately before and rejected banknotes arisen from the sheet set processed immediately before are transported. For example, it is preferable that the first reject unit 41 be used as the transport destination for the first HC 111, the rejected banknotes arisen from the first sheet set 110, the third HC 131, and the rejected banknotes arisen from the third sheet set 130, and the second reject unit 42 be used as the transport destination for the second HC 121, the rejected banknotes arisen from the second sheet set 120, the fourth HC 141, and the rejected banknotes arisen from the fourth sheet set 140.

The HC included in the sheet set processed immediately before and the rejected banknotes arisen from the sheet set processed immediately before can thus be easily extracted from the reject unit 40 without touching the HC and the rejected banknotes included in the sheet set under processing. For example, the first HC 111 and the rejected banknotes arisen from the first sheet set 110 can easily be extracted from the first reject unit 41 during the processing of the second sheet set 120 without touching the second HC 121 and the rejected banknotes arisen from the second sheet set 120.

In addition, the second HC 121 and the rejected banknotes arisen from the second sheet set 120 can easily be extracted from the second reject unit 42 during the processing of the third sheet set 130 without touching the third HC 131 and the rejected banknotes arisen from the third sheet set 130.

Further, the third HC 131 and the rejected banknotes arisen from the third sheet set 130 can easily be extracted from the first reject unit 41 during the processing of the fourth sheet set 140 without touching the fourth HC 141 and the rejected banknotes arisen from the fourth sheet set 140.

When the first recognition information could not be obtained from the HC, the banknote processing apparatus 1 operates as follows.

For example, when the second recognition unit 32 fails to obtain the first recognition information from the first HC 111 in spite that the first HC 111 is recognized to be the HC by the first recognition unit 31, the controller 60 generates second recognition information associated with the first banknote bundle 112. The second recognition information is provisional recognition information alternative to the first recognition information which could not be obtained, and contains the number "999999," for example.

When the controller 60 generates the second recognition information, the controller 60 associates the second recognition information with the first HC 111 and stores the second recognition information in the memory.

Note that, the first HC 111 is transported to the first reject unit 41 also in this case.

Then, the first banknote bundle 112 is processed. The first banknote bundle 112 is a banknote bundle associated with the first HC 111. The second recognition information is also associated with the first HC 111. Thus, when processing the first banknote bundle 112, the controller 60 associates, with the second recognition information, the information on the denomination and the like obtained from each of the banknotes, and stores the information in the memory.

At this time, the banknotes included in the first banknote bundle 112 is transported not to the first reject unit 41 but to the stacking unit 50 and stacked therein as in the case where the first recognition information could be successfully obtained from the first HC 111.

Thereafter, the first HC 111 is extracted from the first reject unit 41 and the first recognition information is read from the first HC 111 using an input unit (not illustrated) at any timing, for example, after the processing of the first banknote bundle is ended.

The input unit is selected appropriately according to the form of the first recognition information given to the first HC 111. For example, when the first recognition information is given in the form of a bar code, a hand-held bar code reader or the like can be used as the input unit. When the first recognition information is a number, a character, or a combination thereof, a scanner having an OCR function, a keyboard, or the like can be used as the input unit.

When the first recognition information is input into the input unit, the controller 60 updates the second recognition information with the first recognition information. That is, the first recognition information input into the input unit is update information for the second recognition information in this case.

Consequently, the information on the denomination and the like obtained from each of the banknotes during the processing of the first banknote bundle 112 is associated with the first recognition information instead of the second recognition information.

In addition, after the first recognition information is read by the input unit, the first HC 111 and the rejected banknotes arisen from the first banknote bundle 112 as stacked on each other are again placed in the banknote inlet unit 10, and processed by the banknote processing apparatus 1 successively. Consequently, the information on the denominations and the like is obtained from the banknotes recognized once to be the rejected banknotes, and is associated with the first recognition information.

Therefore, according to the banknote processing apparatus 1, even when the first recognition information could not be obtained from the first HC 111, the second recognition information is generated and the information obtained from each of the banknotes is associated with the second recognition information, so that it is possible to process the banknotes successively. It is thus possible to continue the processing without any decrease in banknote processing efficiency even when the first recognition information cannot be obtained from the first HC 111.

Needless to say, the processing of the banknotes can likewise be continued successively also when the first recognition information could not be obtained from any other HC than the first HC 111.

Moreover, when the sheet recognized to be the HC by the first recognition unit 31 is actually not the HC, it is necessary to correct the association target of the banknotes provisionally associated with the second recognition information generated to be associated with this sheet (hereinafter, referred to as "erroneously-recognized sheet").

Accordingly, a cancel command to cancel the association between the erroneously-recognized sheet and the second recognition information is input into the input unit in this case. For example, when the sheet transported to the reject unit 40 is a non-HC sheet such as a receipt, the cancel command is input by an operator pressing a cancel button connected to the interface. In this case, the cancel button corresponds to the input unit. The cancel button may be a physical button, or may also be an electronic button displayed on an operation display that the banknote processing apparatus 1 has.

When the cancel command is input, the controller 60 performs processing by which the banknotes processed between the erroneously-recognized sheet whose association with the second recognition information is to be canceled and the HC processed first among those HCs processed after the erroneously-recognized sheet are included in the sheet set including the HC processed last among those HCs processed before the erroneously-recognized sheet.

For example, when the erroneously-recognized sheet is mixed in the first banknote bundle 112, the banknotes processed after the erroneously-recognized sheet and before the second HC 121 which is the HC processed first after the erroneously-recognized sheet are the banknotes to be included in the first banknote bundle 112. Accordingly, the controller 60 performs the processing by which these banknotes are included in the sheet set which includes the first HC 111 being the HC processed last among those HCs processed before the erroneously-recognized sheet, that is, in the first sheet set 110.

Performing such processing makes it possible to appropriately associate the banknotes included in the first banknote bundle 112 with the first HC 111 to process them. It is thus possible, for example, to obtain the following advantages when the first recognition information given to the first HC 111 is the information that "the first sheet set 110 is the proceeds from sales of the store A." That is, the total money amount of the banknotes included in the first banknote bundle 112 and processed before the erroneously-recognized sheet and the total money amount of the banknotes included in first banknote bundle 112 and processed after the erroneously-recognized sheet can be totaled, and the proceeds from sales of the store A can be calculated accurately.

Note that, the controller 60 may perform the processing up to the cancellation of association between the erroneously-recognized sheet and the second recognition information, and processing subsequent to the cancellation, for example, totaling of the amounts of money of the banknotes processed before and after the erroneously-recognized sheet may be performed manually by the operator.

In the embodiment described above, when the first recognition information could not be read from the processing-target sheet and the processing-target sheet is the HC, the controller 60 generates the second recognition information associated with the processing-target sheet. However, conditions for generation of the second recognition information associated with the processing-target sheet by the controller 60 are not limited to such a case.

For example, when the first recognition information cannot be read from the processing-target sheet and when the processing-target sheet is a processing-target sheet processed first when the processing of the sheet group is started, the controller 60 may generate the second recognition information associated with the processing-target sheet. This is because, if the HC is the processing-target sheet processed first in each of the sheet sets, the processing-target sheet processed first in the sheet group is the HC and it is possible to consider that the processing-target sheet processed first after the processing of the sheet group is started is the HC.

Note that, the controller 60 can detect the start of processing of the sheet group, for example, when a physical or electronic processing start button provided in the banknote processing apparatus 1 is pressed after the sheet group is placed in the banknote inlet unit 10.

In addition, when the first recognition information cannot be read from the processing-target sheet and when the processing-target sheet is a processing-target sheet processed first after processing of another sheet group different from the sheet group including the processing-target is ended, the controller 60 may generate the second recognition information associated with the processing-target sheet. This is because, if the HC is the processing-target sheet processed first in each of the sheet sets, the processing-target sheet processed first after the processing of the other sheet group (that is, the sheet group processed immediately before) is ended is the HC and it is possible to consider that the processing-target sheet processed first after the processing of the other sheet group is ended is the HC.

Note that, the controller 60 can detect the end of processing of the sheet group, for example, when a physical or electronic processing end button provided in the banknote processing apparatus 1 is pressed after the processing of the sheet group is ended.

In addition, when the controller 60 outputs a processing result based on the recognition result by the recognition unit 30 (for example, when information on the proceeds from sales of the store A is transmitted to a terminal) after the processing of the sheet group is ended, such output of the processing result means that the processing of the sheet group is ended. That is, when the processing-target sheet is a processing-target sheet processed first after the output of the processing result, this processing-target sheet is considered to be the processing-target sheet processed first after the processing of the other sheet group is ended.

Therefore, when the controller 60 outputs the processing result based on the recognition result by the recognition unit 30 after the processing of a sheet group is ended, and when the first recognition information cannot be read from the processing-target sheet and the processing-target sheet is a processing-target sheet processed first after the processing result has been output, the controller 60 may generate the second recognition information associated with the processing-target sheet. This is because, if the HC is the processing-target sheet processed first in each of the sheet groups, the processing-target sheet processed first after the output of the processing result is the HC and it is possible to consider that the processing-target sheet processed first after the output of the processing result is the HC.

In addition, when a pair of HCs sandwich the banknote bundle in each of the sheet sets, and when the first recognition information cannot be read from the processing-target sheet and the processing-target sheet is a sheet processed immediately after processing of latter one of the pair of HCs in another sheet set different from the sheet set including the processing-target sheet, the controller 60 may generate the second recognition information associated with the processing-target sheet. This is because, when the pair of HCs sandwich the banknote bundle in each of the sheet sets, the processing-target sheet processed immediately after the processing of latter one of a pair of HCs in a sheet set is former one of a pair of HCs in a sheet set processed next.

The banknote processing apparatus 1 described so far is configured such that various kinds of operations and controls are performed by the CPU being a component of the controller 60 executing the program stored in the memory being a component of the controller 60. However, the aforementioned various operations and controls may also be carried out by a sheet processing system comprising the banknote processing apparatus 1 and a terminal communicably connected to the controller 60 via an interface.

In that case, the terminal obtains the second recognition information from the controller 60. Then, the terminal can carry out some or all of the various controls described above by storing the second recognition information in a storage that the terminal includes, and by updating the second recognition information with the update information input via the input unit. That is, some or all of the various controls described above may be carried out by the terminal executing predetermined programs. Note that, a stationary computer, a portable computer, such as a note-type personal computer, a tablet computer, a smartphone, or the like; or the like can be used as the terminal, for example.

Figure 3:
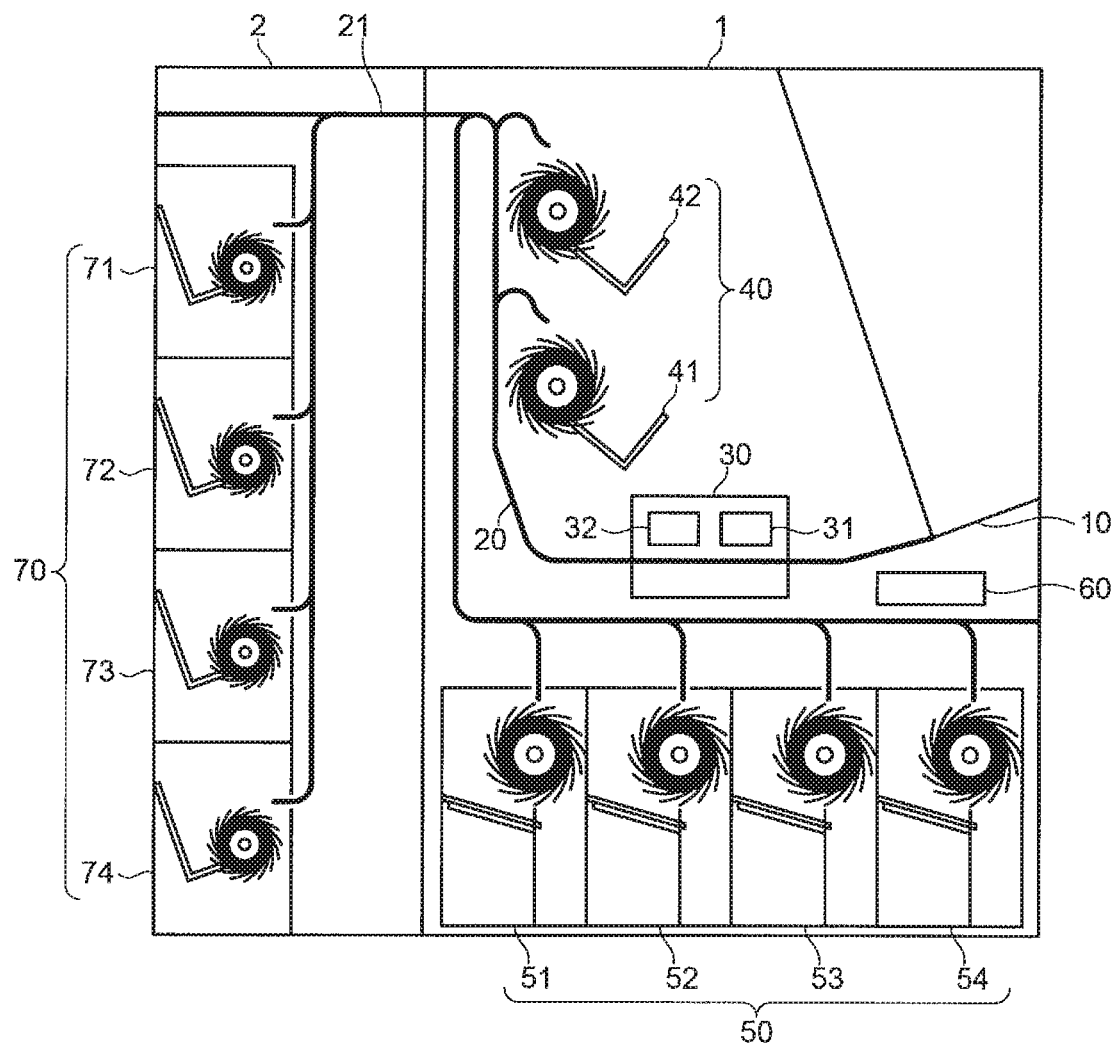
FIG. 3 schematically illustrates a sheet processing apparatus according to another embodiment.

In addition, an extension unit 2 including an additional transport unit 21 and an additional stacking unit 70 may also be connected to the banknote processing apparatus 1 as illustrated in FIG. 3. In the case of the present embodiment, the additional stacking unit 70 is comprised of a first additional stacker 71, a second additional stacker 72, a third additional stacker 73, and a fourth additional stacker 74.

The additional stacking unit 70 can be used as the transport destinations of the sorted banknotes. It is thus possible to sort the banknotes more variously and to stack the sorted banknotes.

The additional stacking unit 70 can be used as the transport destinations of the rejected banknotes. In this case, the HCs and the rejected banknotes can be stacked in places different between the sheet sets. Consequently, an operation of sorting the rejected banknotes by sheet set becomes unnecessary, so that it is possible to increase the banknote processing efficiency.

In addition, it is probable that miscellaneous sheets mixed in the sheet group 100 are transported to the reject unit 40 in addition to the HCs and the rejected banknotes, or sheets are folded in the reject unit 40 or clog the reject unit 40. This causes to prevent the sheets from being stacked in the reject unit 40 in the order in which the sheets are transported. That is, when the rejected banknotes of a plurality of sheet sets are stacked in the first reject unit 41 or in the second reject unit 42, there is a risk that the rejected banknotes arisen from a plurality of different sheet sets are not stacked in the order in which they are processed, so that they are mixed. In contrast to this, when there is the additional stacking unit 70 connected to the banknote processing apparatus 1, the transport destinations of the rejected banknotes are different between the sheet sets, so that it is possible to beforehand prevent the rejected banknotes of a plurality of sheet sets from being mixed.

Note that, the reject unit 40 may include a display unit such that the display unit is adjacent to stacking place (e.g., the first reject unit 41), and the additional stacking unit 70 may include a display unit such that the display unit is adjacent to stacking place (e.g., the first additional stacker 71). In this case, it is possible to increase the convenience for the operator by the display unit displaying information read from the HC transported to each of the stacking places (e.g., information indicating from which store's proceeds from sales the rejected banknotes are arisen). Alternatively, the display unit may also display which stacking place the HC from which the first recognition information could not be read is stacked. This makes it possible to increase the efficiency of an operation of reading the first recognition information from the HC using the hand-held bar code reader or the like.

In addition, when an error arises during processing of banknotes in a sheet organizing apparatus or the like comprising the same hardware as the sheet processing apparatus 1 illustrated in FIG. 1, it has been conventionally necessary to first cancel a counted value by that time and recount the banknotes. That is, it has been necessary to collect an actual HC and actual banknotes constituting each of the sheet sets from the first reject unit 41 or the second reject unit 42 and from the first stacker 51 to the fourth stacker 54, and to reconstruct each of the sheet sets, and then place these sheet sets in the banknote inlet unit 10 to process them again.

However, those banknotes processed before the error arises are not kept together in the sheet sets anymore, and are mixed in the banknotes of other sheet sets in the first reject unit 41, the second reject unit 42, and the first stacker 51 to the fourth stacker 54. Accordingly, it is extremely difficult in fact to reconstruct each of the sheet sets.

In this respect, when an error arises during processing of the banknotes, the following processing allows efficient recovery from the error. To begin with, of all the counted banknotes, the banknotes except those banknotes extracted from the stacking unit 50, that is, the banknotes existing in the stacking unit 50 and on the transport unit 20, are placed in the banknote inlet unit 10 and recounted for each denomination. Next, the number of the banknotes included in the sheet set for which processing has been completed before the error arises and for which the number of the banknotes included in the sheet set for each denomination has been fixed are subtracted from a recounting result for each denomination. Next, the remainder is considered to be the banknotes included in the sheet set which was being processed when the error arose.

Note that, the banknotes already extracted from the stacking unit 50 can be automatically recovered on the basis of processing result data stored in the controller 60 or in the terminal connected to the controller 60, or on the basis of a communication record between the controller 60 and the terminal. Thus, the banknotes to be recounted may only be those existing in the stacking unit 50 and on transport unit 20 (that is, of all the counted banknotes, those which have not been extracted yet from the stacking unit 50).

Therefore, even when an error arises during the processing of the sheet group including a plurality of sheet sets, the processing described above makes it possible to reproduce the sheet set which was being processed when the error arose, only by counting the banknotes existing in the stacking unit 50 and on the transport unit 20. The processing described above allows efficient recovery from the error during the processing of the sheet group including a plurality of sheet sets. Note that, the banknote bundle located at the lowermost part in the sheet group stacked in the banknote inlet unit when the error arises is a banknote bundle included in the sheet set which was being processed when the error arose. The counting result of the banknote bundle processed first after the recovery from the error is thus added to the counting result of the sheet set which was being processed when the error arose.

Whereas embodiments of the present invention have been described above, the present invention is not limited to the above embodiments, and various changes can be made without departing from the spirit and scope of the present invention. For example, the sheet used as a processing target is not limited to the banknote. The processing target may also be sheets, such as a check, a voucher, and the like made of paper, resin, or the like.

The disclosure of Japanese Patent Application No. 2017-146768 dated Jul. 28, 2017 including the specification, drawings and abstract is incorporated herein by reference in its entirety.

INDUSTRIAL APPLICABILITY

The present invention is applicable to a sheet processing apparatus that processes a sheet with a header card. Accordingly, the present invention is greatly industrially applicable.

REFERENCE SIGNS LIST

1 Banknote processing apparatus (sheet processing apparatus)
2 Extension unit
10 Banknote inlet unit
20 Transport unit
21 Additional transport unit
30 Recognition unit
31 First recognition unit
32 Second recognition unit
40 Reject unit
41 First reject unit
42 Second reject unit
50 Stacking Unit
51 First stacker
52 Second stacker
53 Third stacker
54 Fourth stacker
60 Controller
70 Additional stacking unit
71 First additional stacker
72 Second additional stacker
73 Third additional stacker
74 Fourth additional stacker
100 Sheet group
110 First sheet set
111 First header card (First HC)
112 First banknote bundle
120 Second sheet set
121 Second header card (Second HC)
122 Second banknote bundle
130 Third sheet set
131 Third header card (Third HC)
132 Third banknote bundle
140 Fourth sheet set
141 Fourth header card (Fourth HC)
142 Fourth banknote bundle

The invention claimed is:

1. A sheet processing apparatus that successively processes a plurality of processing-target sheets forming a sheet group, the sheet group comprising at least one sheet set, the at least one sheet set comprising a first sheet that is given first recognition information and a second sheet, the first sheet being not a banknote, the second sheet being a banknote, the first recognition information being information for identifying an attribute of the second sheet, the sheet processing apparatus comprising:
- a sensor that obtains the first recognition information from one of the plurality of processing-target sheets; and
- a controller that generates second recognition information associated with the one of the plurality of processing-target sheets when the sensor fails to obtain the first recognition information from the one of the plurality of processing-target sheets and a predetermined condition is satisfied, the second recognition information being alternative to the first recognition information that is failed to be obtained by the sensor.

2. The sheet processing apparatus according to claim 1, wherein:
- the sensor recognizes whether or not the one of the plurality of processing-target sheets is the first sheet, and
- the predetermined condition is that the one of the plurality of processing-target sheets is the first sheet.

3. The sheet processing apparatus according to claim 1, wherein
- the predetermined condition is that the one of the plurality of processing-target sheets is a sheet to be processed first when processing of the sheet group including the plurality of processing-target sheets is started.

4. The sheet processing apparatus according to claim 1, wherein:
- the predetermined condition is that the one of the plurality of processing-target sheets is a sheet to be processed first after processing of another sheet group different from the sheet group comprising the plurality of processing-target sheets is ended.

5. The sheet processing apparatus according to claim 1, wherein:
- the controller outputs a processing result based on a recognition result by the sensor after processing of a sheet group including a plurality of processing-target sheets is ended, and
- the predetermined condition is that the one of the plurality of processing-target sheets is a sheet to be processed first after the processing result has been output.

6. The sheet processing apparatus according to claim 1, further comprising:
- a computer device that is electrically connected to the controller, into which either update information of the second recognition information, or a cancel command to cancel association between the one of the plurality of processing-target sheets and the second recognition information is input, wherein
- the controller updates the second recognition information or cancels the association respectively based on the update information or the cancel command.

7. The sheet processing apparatus according to claim 6, wherein
- the first recognition information is input into the computer device as the update information, and the controller updates the second recognition information with the first recognition information input into the computer device.

8. The sheet processing apparatus according to claim 6, wherein
the at least one sheet set comprises a plurality of sheet sets, and
the controller performs processing by which at least one of the second sheets is included in one of the plurality of sheet sets, the at least one of the second sheets being one that has been processed between the one of the plurality of processing-target sheets whose association with the second recognition information is to be canceled and a first sheet processed first among at least one of the first sheets processed after the one of the plurality of processing-target sheets whose association with the second recognition information is to be canceled, the one of the plurality of sheet sets being one that comprises a first sheet processed last among at least one of the first sheets processed before the processing-target sheet whose association with the second recognition information is to be canceled.

9. A sheet processing system, comprising:
a sheet processing apparatus that successively processes a plurality of processing-target sheets forming a sheet group, the sheet group comprising at least one sheet set, the at least one sheet set comprising a first sheet that is given first recognition information and a second sheet, the first sheet being not a banknote, the second sheet being a banknote, the first recognition information being information for identifying an attribute of the second sheet; and
a terminal, wherein
the sheet processing apparatus comprises:
- a sensor that obtains the first recognition information from one of the plurality of processing-target sheets; and
- a controller that generates second recognition information associated with the one of the plurality of processing-target sheets when the sensor fails to obtain the first recognition information from the one of the plurality of processing-target sheets and a predetermined condition is satisfied, the second recognition information being alternative to the first recognition information that is failed to be obtained by the sensor, and
the terminal is communicably connected to the sheet processing apparatus and obtains the second recognition information.

10. A sheet processing method for successively processing a plurality of processing-target sheets forming a sheet group, the sheet group comprising at least one sheet set, the at least one sheet set comprising a first sheet that is given first recognition information and a second sheet, the first sheet being not a banknote, the second sheet being a banknote, the first recognition information being information for identifying an attribute of the second sheet, the sheet processing method comprising:
- obtaining the first recognition information from one of the plurality of processing-target sheets; and
- generating second recognition information associated with the one of the plurality of processing-target sheets when the first recognition information is not obtained successfully from the one of the plurality of processing-target sheets and a predetermined condition is satisfied, the second recognition information being alternative to the first recognition information that is failed to be obtained by the obtaining.

* * * * *